Aug. 31, 1926. 1,598,173
H. D. TANNER ET AL
GEAR TOOTH GENERATOR
Filed Feb. 26, 1923 4 Sheets-Sheet 4
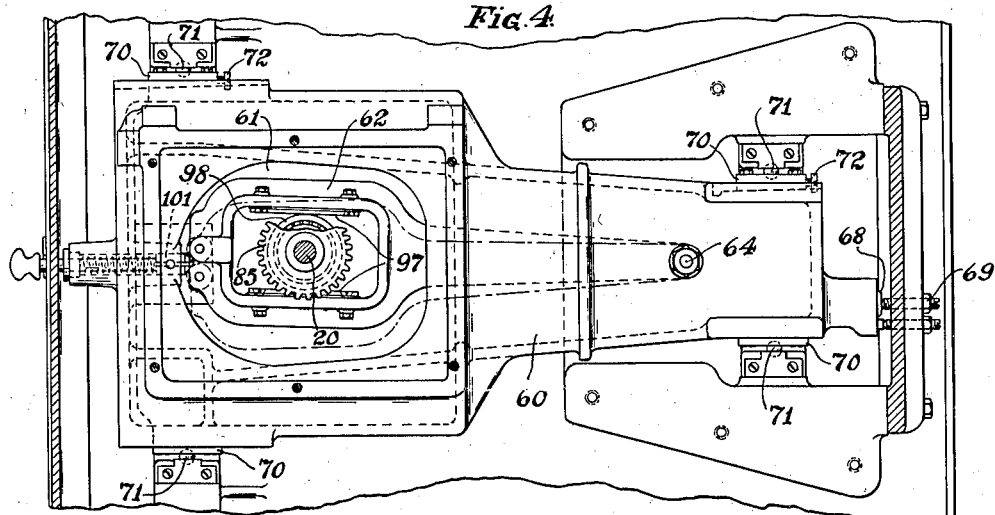
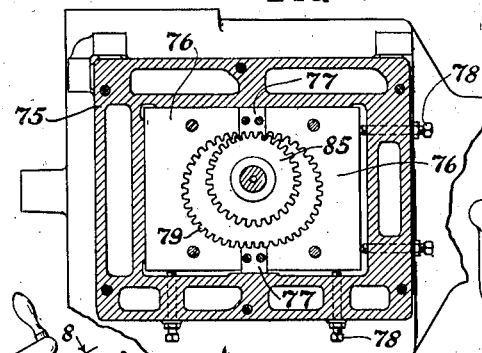
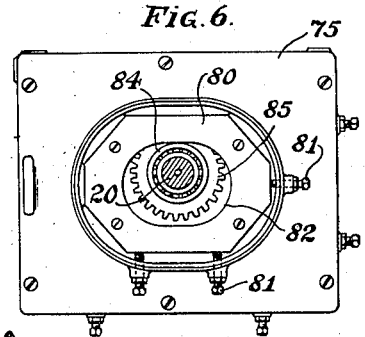
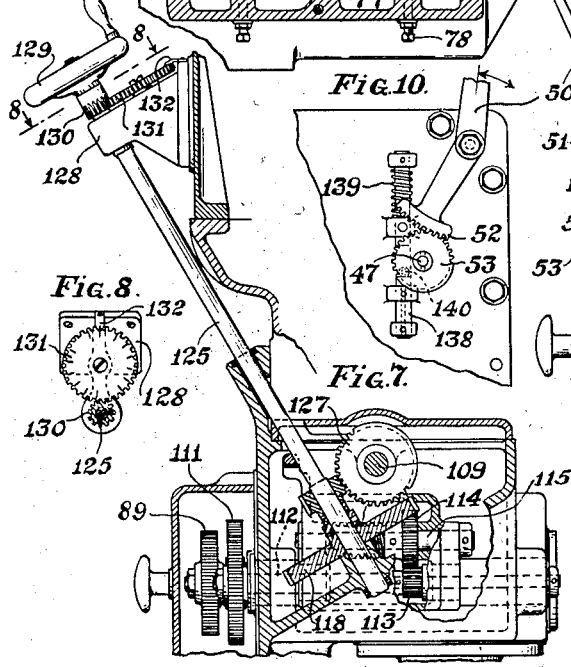
INVENTOR
H. D. Tanner and
Carroll Knowles
BY
Joseph N. Schofield
ATTORNEY Patented Aug. 31, 1926.

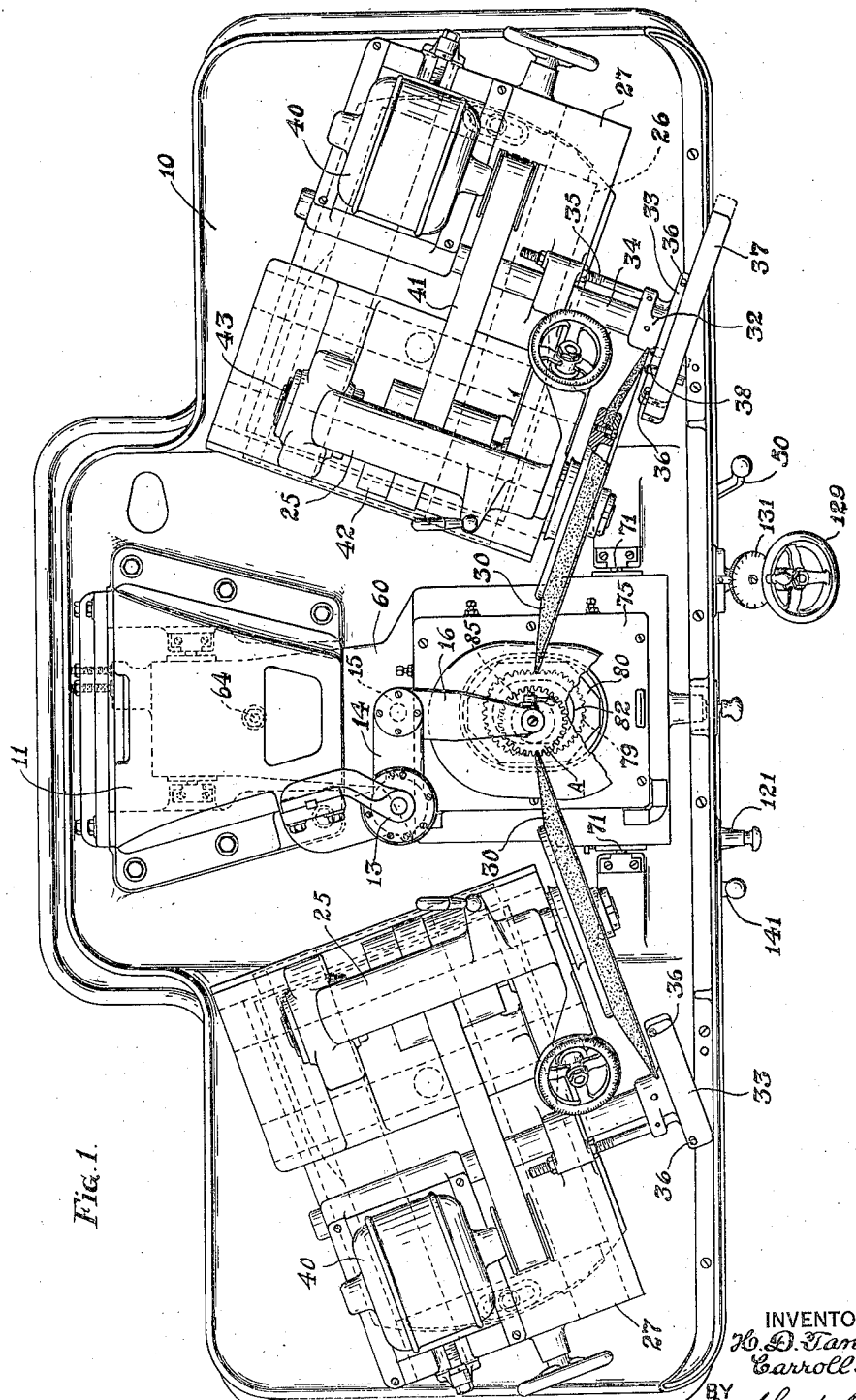

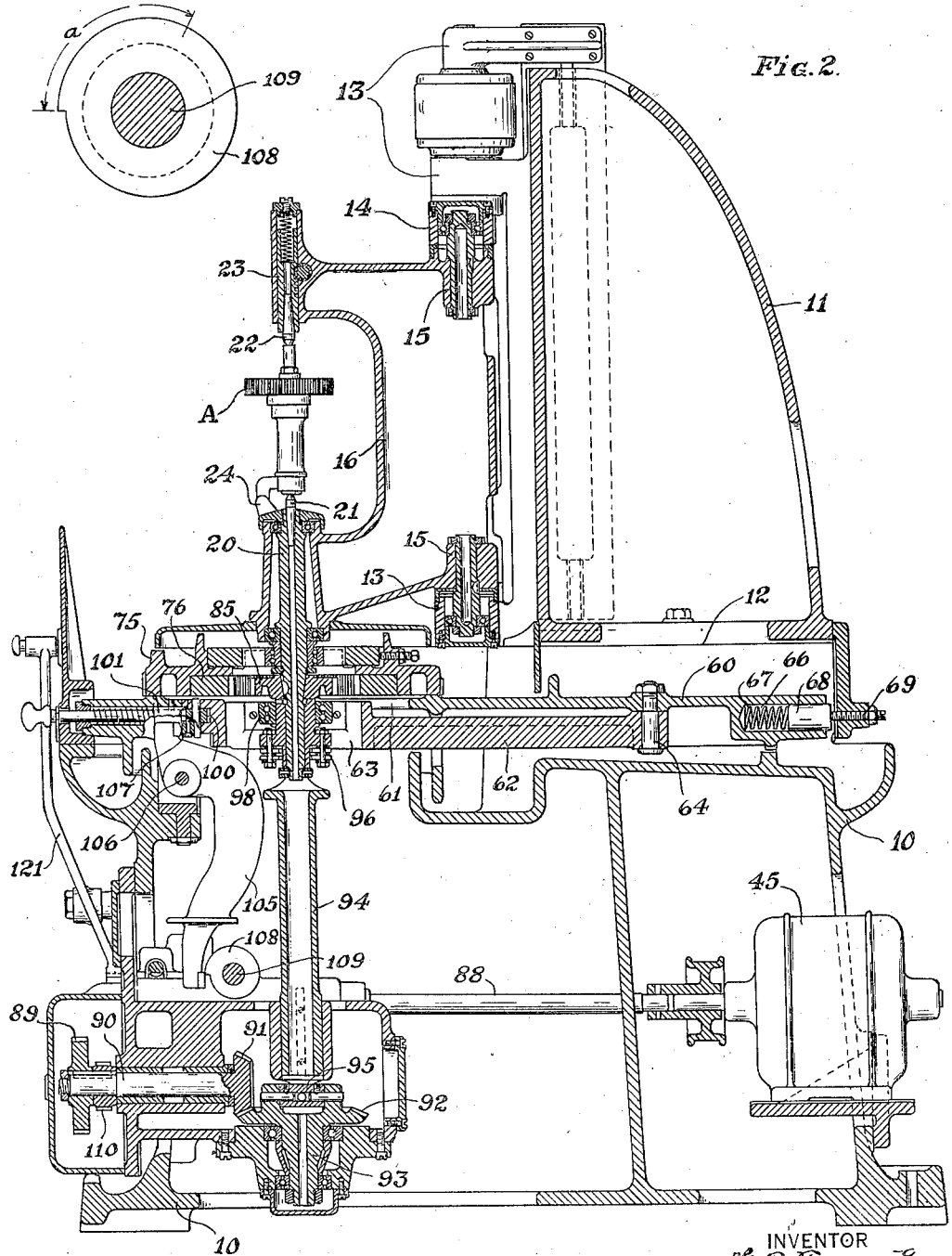

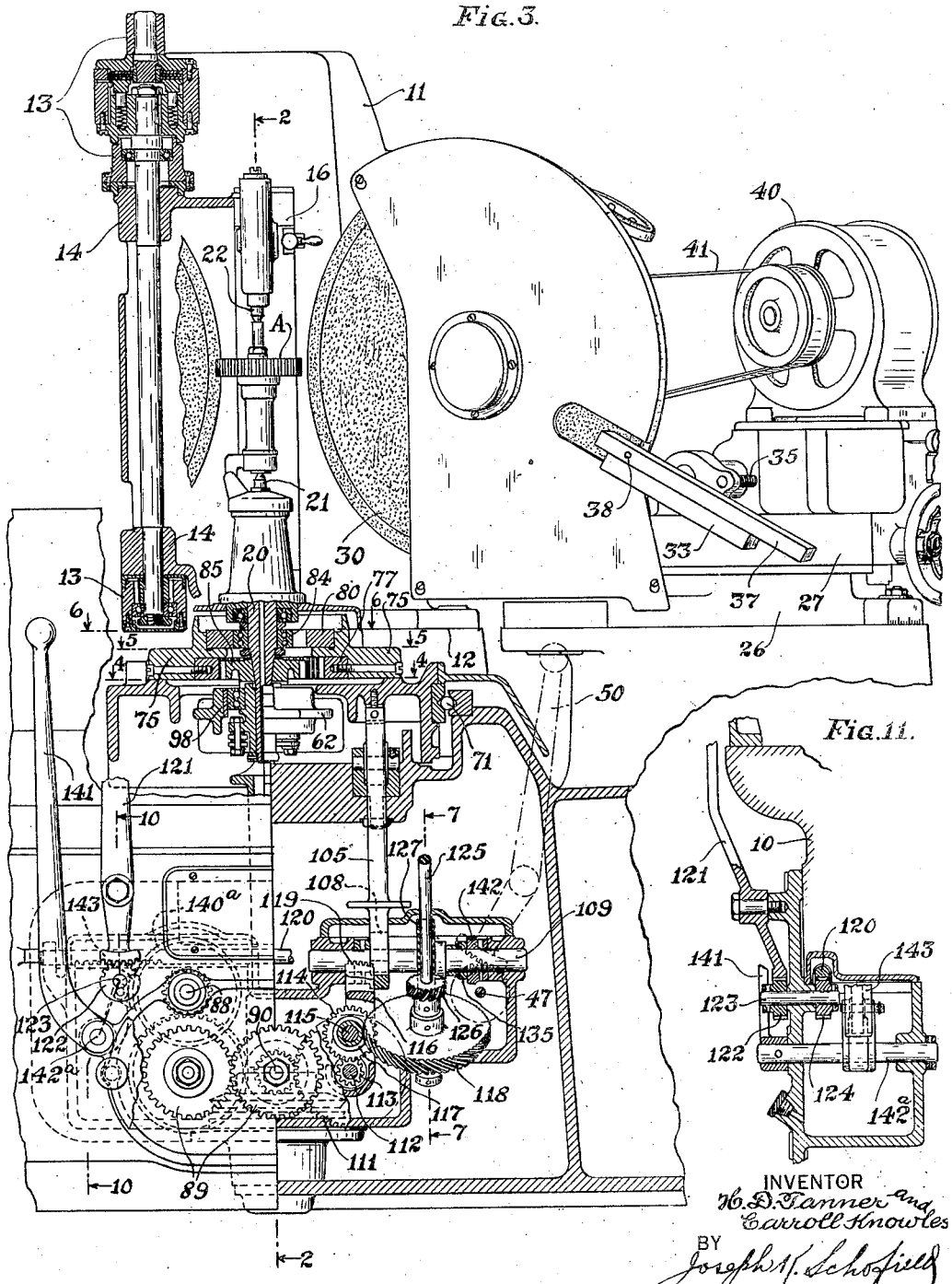

1,598,173

UNITED STATES PATENT OFFICE.

HUBERT D. TANNER AND CARROLL KNOWLES, OF HARTFORD, CONNECTICUT, ASSIGNORS TO PRATT & WHITNEY COMPANY, OF NEW YORK, N. Y., A CORPORATION OF NEW JERSEY.

GEAR-TOOTH GENERATOR.

Application filed February 26, 1923. Serial No. 621,307.

This invention relates to a gear tooth generating machine and in particular to a machine of this type which will rapidly and accurately generate involute curves on the tooth flanks of gears within a wide range of sizes.

More particularly the present invention relates to a machine which will accurately generate the tooth curves of spur gears, after they have been hardened, by the action of plane sided abrasive wheels. It will be understood, however, that any form of cutting element rotatably mounted may be substituted for the abrasive wheels shown.

The object of the present invention is to provide improved mechanism for mounting the work blank and for actuating it in accordance with and upon a closed path whereby the gear blank is in effect caused to roll along a rack upon its pitch cylinder, or upon another cylinder co-axial therewith while engaged with the cutting wheel or wheels.

Another object of the invention is to provide automatic feeding means for advancing the work toward the cutting surface of the abrasive wheel or wheels which will enable the machine to operate substantially without attention after it has been started in operation.

One of the features of the invention which is advantageous is that the work is mounted on a vertical spindle carried by means of freely swinging arms presently more fully to be described. This work spindle is given a bodily movement in an orbital or planetary path while the axis of the spindle is maintained in parallel position. This movement, together with a rotary movement of the blank induced by engagement of racks with a master gear on the work spindle, is such that it presents successive teeth of the blank in proper grinding position relative to the wheels.

Another feature which enables us to accomplish the operation of the machine in a substantially automatic manner is that the movement of the work spindle and its co-operating parts are controlled by a frame or slide which may be given a slight longitudinal movement. This movement of the frame or slide is induced by means of a lever, one arm of which engages one of the surfaces of this slide and the other arm is in engagement with a spiral cam. Oscillation of the lever in one direction and consequent movement of the slide serves to feed the work blank toward the grinding surface of each of the wheels. Continued rotation of the cam stops the feeding movement and returns the slide and the parts controlled thereby to their initial positions.

A principal object of the present invention is to improve and render automatic the mechanism disclosed and claimed in the co-pending application of H. D. Tanner, Serial No. 544,176, filed March 16th, 1922.

With these and other objects in view, our invention consists in the features of construction and operation set forth in the following specification and illustrated in the accompanying drawings.

In the accompanying drawings annexed hereto and forming a part of this specification, we have shown our invention embodied in a machine for grinding narrow spur gears but it will be understood that the invention can be otherwise embodied and that the drawings are not to be construed as defining or limiting the scope of the invention, the claims appended to this specification being relied upon for that purpose.

In the drawings:—

Figure 1 is a plan view of the complete machine.

Fig. 2 is a transverse sectional view taken substantially upon the line 2—2 of Fig. 3.

Fig. 3 is a front elevation of the major portion of the machine, parts being broken away to more clearly show the construction of some of the mechanism.

Fig. 4 is a plan view of a portion of the machine with the work spindle carrying arms removed.

Fig. 5 is a plan view of the work spindle-guiding means taken on line 5—5 of Fig. 3.

Fig. 6 is a view taken on line 6—6 of Fig. 3.

Fig. 7 is a side elevation in section of a part of the feeding mechanism.

Fig. 8 is a detail thereof taken on line 8—8 of Fig. 7.

Fig. 9 is a side view in section of a part of the feed mechanism, particularly the means to automatically stop operation of the machine.

Fig. 10 is a front elevation of the parts shown in Fig. 9.

Fig. 11 is a side view in section of other details of the machine, and

Fig. 12 is a detail view of the cam for feeding the work relative to the wheels.

In the above mentioned drawings we have shown but one modification of the invention which is now deemed preferable but it is to be understood that changes and modifications may be made within the scope of the appended claims without departing from the spirit of the invention.

Briefly, our invention in its broadest aspect comprises the following principal parts: first, a base; second, adjustable wheel carrying heads mounted on slides thereon and having rotatable abrasive wheels preferably so disposed that their positions may be varied both angularly and linearly in directions at right angles to each other so that they may be adjusted properly for different diameters and types of gears being ground; third, a column on the base; fourth, freely swinging arms pivotally mounted thereon and adapted to support the blank being operated on upon a rotatable spindle maintained in a vertical axis at their free ends; fifth, a slide movable forwardly and rearwardly within the base; sixth, an orbital or planetary path on said slide comprising two oppositely disposed racks and portions of internal gears; seventh, another path fixed to said slide in the form of a correspondingly shaped orbit, the walls of which are plane; eighth, means to move said slide a slight distance during operation to effect feeding of the blank relative to the wheels; ninth, means to rotate said work spindle whereby its axis is made to traverse about the above defined orbit and while its axis is maintained vertical at all times; and tenth, automatic means to return the said slide to its initial position and stop further operation of the machine at any predetermined desired position.

Referring more in particular to the figures of the drawings, we provide a base 10 having rigidly fastened thereto a vertically extending column 11. Preferably, as shown, this column 11 is attached to the upper horizontal surface 12 of the base 10 and approximately in the central rear portion thereof. On this column 11 are bearings 13 disposed for freely supporting an arm 14 to swing about a vertical axis. At the free end of this arm 14 are bearings 15 adapted so as to support another freely swinging arm 16 to swing about a vertical axis. The outer or free end of this latter arm 16 carries the supporting means for the gear blank A being operated on whereby the blank is maintained with its axis extending vertically. The method of constraining the swinging movements of the two above described arms 14 and 16 so that the axis of the blank is moved about in a closed path will presently be described.

The particular means for mounting the gear blank A at the free end of arm 16 is on a spindle 20 rotatably mounted in a vertical axis on arm 16. This spindle 20 is in driving connection with rotating means, presently to be described, and is provided at its upper end with a center 21. In alignment with center 21 is another center 22 fixed in a sleeve 23 slidably mounted in arm 16. By adjusting the position of the sleeve 23 an arbor carrying the gear blank A can be mounted on the centers 21 and 22 and rotated by the driving means 24.

The construction of the column 11, the swinging arms 14 and 16, the supports on the arm for the work being operated upon, and the work rotating means are substantially duplicates of the corresponding parts described in the above referred to copending application so that a further description thereof will not be necessary.

Mounted upon the upper horizontal surface of the bed are wheel heads 25 preferably mounted upon members 26 and 27 so that they may be positioned at any distance from and at any angle relative to the path of movement of the work spindle 22. Preferably the wheel head 25 is mounted upon ways on the upper surface of the member 27 so that it may be advanced axially to position the wheel 30 relative to the work. The slide member 27 is in turn mounted upon ways on the upper surface of the member 26 so that it is movable in a direction normal to the movement of the wheel head 25. The member 26 is preferably so mounted on the surface of the base 10 that it may be angularly adjusted about a vertical axis so that the position of the wheel 30 may be positioned at any desired angle relative to the path of movement of the gear blank A.

Preferably, the wheels 30 used in this machine as shown, comprise disks slightly dished and adapted to operate upon the gears being ground on one of their radial surfaces. The work engaging surfaces of the wheels 30 may be maintained accurately in predetermined position by means of a dressing attachment 32 normally fitted to and forming part of the equipment mounted on the angularly adjustable member 26. By periodic axial adjustment of the wheel 30 by movement of the wheel head 25 and use of the dressing device 32, the work engaging surface of the wheel 30 can be maintained accurately in any predetermined position.

This dressing device 32 may preferably have a supporting member 33 thereon and is rigidly secured to a bar or rod 34 slidable within suitable bearings in the wheel head 27. By means of a threaded member 35 the device 32 and its support 33 may be adjusted toward or from the work engaging surface of the wheel 30. Pins 36 on the support 33 provide guides for the dressing tool 37 which may carry a diamond or other form of wheel surfacing tool 38. The positions of the support 33 and its guide pins 36 are such that the diamond 38 may be passed across the surface of the wheel 30 in a direction exactly normal to the axis thereof.

It will be understood that the type of wheel used and its mounting may be widely varied, the purpose of the above described construction being to permit the plane work contacting surface of the wheel 30 to be adjusted angularly about a vertical axis and positioned accurately relative to the path of movement of the work spindle 20, all of these adjustments being accomplished while the work engaging surface of the wheel is maintained accurately in vertical planes. As shown, each of the wheels is mounted on an independent head 25 and is rotated by means of an independent motor 40 preferably mounted on the particular head. This motor 40 is in driving connection with its wheel 30 through a belt 41 passing over an elongated pulley 42 keyed directly to the wheel spindle 43.

The main source of power for the machine in the present instance whereby the gear blank A is simultaneously rotated and moved about in an orbit comprises a motor which is adapted to be started and stopped by any suitable means as by means of a main switch. As this switch may be of any convenient form and forms no part of the present invention, it is not shown in the drawings. To actuate the main switch, or other starting and stopping means for the machine, a shaft 47 is provided extending forwardly and rearwardly of the machine, the rear end being connected to the switch, or other starting means, so that oscillation of the shaft serves to start or stop operation of the motor 45 and of the machine.

A main operating lever 50 is provided, preferably as shown, being pivoted to a stud 51 on the front vertical surface of the machine. This lever 50 at its lower end is provided with a segmental gear 52 in mesh with a gear 53 secured to the forward end of the motor controlling shaft 47. From the above it will be seen that oscillation of the main control lever 50 in one direction will start operation of the machine and oscillation in the opposite direction will stop it.

The work spindle 20 while mounted to rotate about a vertical axis and to be freely moved about by reason of its mounting on the free end of the swinging arms 14 and 16 is, during operation of the machine, constrained to move in a predetermined closed orbital path. The mechanism for accomplishing this bodily movement of the work spindle 20 will now be described. Mounted so that it may slide a short distance forward and rearward within the base 10 is a horizontally extending slide member 60 provided near its forward portion with an oblong opening 61. Pivotally mounted on this member 60 is an arm 62 also having an opening 63 adjacent to and just below the opening 61 in the slide member 60. This arm 62 is attached to the slide 60 by means of a vertically disposed pin 64 mounted adjacent the rearward portions of the slide 60. It will be seen from this construction that the arm 62 may have a swinging movement to the left or right of the machine and that the horizontal slide 60 may be given a movement forward and rearward of the machine. Preferably and as shown, the slide 60 is provided with a recess 66 in its rearward portion in which is mounted a spring 67 and a plunger 68 therefor slidable within the recess 66 and which may contact with an adjustable abutment 69 in the form of a screw mounted rigidly in rear of the machine. This spring 67 tends therefore to force the slide 60 as far forward as possible.

Fig. 4 of the drawings shows clearly in plan the mounting for the feed slide 60 and its attached parts. In order that this slide 60 may move forward and rearward with a minimum of friction, it is preferably mounted to slide on ball bearings. For this purpose on either side of the slide adjacent both the forward and rearward ends are V-ways 70 in which balls 71 may operate, the opposite sides of the ways being provided on the base. To take up lost motion due to wear on the parts of these bearings, the ways on one side of the feed slide are mounted on a slightly tapered block which is made adjustable by means of a screw 72 as shown.

On the upper surface of the slide 60 is mounted fixedly thereto a member 75 having upper and lower rectangular recesses therein. This latter member 75 is disposed so that its rectangular openings or recesses are disposed contiguous to the opening 61 in the feed slide 60. These openings or recesses formed in the member 75 are preferably on either side of a central web of the slide and are formed by flanges extending respectively upward and downward therefrom.

Within the lower opening of this member attached to the feed slide are fitted parts as shown in Fig. 5, namely, two members 76 having portions of an internal gear formed thereon, these parts being held apart by oppositely disposed members 77 provided with several teeth of a rack. Each of these members 76 and 77 is fastened in position within the recess in the member and held in position therein by means of the locking screws 78 as shown in Fig. 5. It will be noted in examining Fig. 5 that the rectangular opening has been restricted by these members and the periphery of the restricted opening 79 formed by the members 76 and 78 is serrated throughout by gear teeth of uniform pitch extending completely around the opening formed by these parts.

Within the upper recess of the member 75 is mounted the plate 80 as shown in Fig. 6. This may be securely held in position within the recess by means of the locking screws 81. This plate 80 is provided with a generally elliptical form of opening 82 so disposed that it is directly above the opening 61 in the feed slide 60 and symmetrically disposed relative to the serrated opening 79 within the lower recess of the member 75 fixed to the feed slide 60. The two openings, one 79 being serrated as shown in Fig. 5 and the other 82 plain and of general elliptical form shown in Fig. 6, are so related that while the outer periphery of a ball bearing 84 mounted on the lower end of the work spindle 20 may contact with the periphery of the opening 82 shown in Fig. 6, a master gear 85 also mounted on the work spindle 20 may be maintained in engagement with the teeth on the periphery of the opening 79 as shown in Fig. 5.

The work spindle 20 rotatably mounted at the free ends of the swinging arms 14 and 16 throughout the normal operation of the machine is rotated preferably at a uniform rate. This is accomplished by means of the motor 45 which for convenience may be mounted directly within the base of the machine. This motor 45 through geared driving connections comprising the shaft 88 and change gears 89 as shown in Fig. 2 drives a short horizontal shaft 90 having a bevel gear 91 on its rear end. This bevel gear 91 is in engagement with a corresponding bevel gear 92 on a short shaft 93 mounted to rotate about a vertical axis. This short shaft 93 is in connection with a vertical shaft 94 preferably adapted to telescope as shown in Fig. 2 and which is attached to the short shaft carrying the bevel gear by a universal or flexible coupling 95. The upper end of this telescoping shaft 94 is made fast preferably through a universal or flexible coupling 96 to the lower end of the work spindle 20. It will be seen therefore that rotation of the motor 45 will constantly rotate the work spindle 20 at a uniform speed.

The action of rotating the work spindle 20 will tend to force the spindle to follow a planetary or orbital path of movement by reason of the engagement of the master gear 85 with the toothed outline of the opening 79 previously referred to. We find, however, that it is preferable to hold the spindle 20 toward one or the other side of its orbital path during that portion of its movement that the gear blank A is in grinding contact with the wheels 30. It is for this purpose that the swinging arm 62 is provided and mounted upon the feed slide 60.

At the forward end of the arm 62 mounted to swing laterally relative to the feed slide 60 is the elongated opening 63 previously mentioned; the opposite sides of this opening are provided with bearing strips 97 as shown in Fig. 4. These bearing strips 97 are adapted to contact with the periphery of a ball bearing 98 mounted on the upper end of the flexible coupling 96 on the driving shaft 94 for the work spindle 20.

At the forward end of the arm 62 is a roller 100 rotatably secured to the extension of the arm as shown in Fig. 2. Adapted to contact with this roller 100 is a spring pressed plunger 101 mounted in the forward end of the feed slide 60. The rear end of this plunger 101 is pointed so that with the oscillatory movements of the arm 62, the plunger 101 may spring back and engage the roller 100 upon opposite sides. In this way the swinging arm 62 is resiliently retained in either of its side positions. With these described means and with the ball bearing 98 in engagement with bearing strips 97, movement of the work spindle 20 about its orbital path first moves the swinging arm 62 toward one side and then toward the other. Also, while the spindle 20 is moving about the opposite straight portions of its orbit, the spindle 20 is resiliently retained with the ball bearing 84 in contact with the plate 80 and with the master gear 85 in contact with the serrated path 79.

It will be understood that the members 76 and 77 and the plate 80 will be chosen with particular reference to the gear blank being ground. Also, with the spindle 20 provided with a master gear 85 corresponding generally with the blank being ground, the combined movements given the spindle 20 will in effect cause a rolling movement of the blank on its pitch cylinder about an orbital path.

The feeding movement for advancing the work blank A relative to the wheels 30 is accomplished by rearward movement of the main feed slide 60. Movement of this slide 60 rearwardly advances the orbital paths 79 and 82 in a direction directly toward the wheels 30 which paths respectively contact with the master gear 85 and the ball bearings 84 on the work spindle 20. Movement therefore of the feed slide 60 rearwardly thus forces the sides of the teeth on the gear blank A being ground into grinding engagement with the work engaging radial surfaces of the abrasive wheels 30. This contact takes place while the blank A on the work spindle 20 is in effect being rolled past each of the wheels 30. In order to accomplish this movement of the slide 60 slowly and uniformly in its feeding direction a lever 105 mounted within the base 10 is pivoted about a horizontal axis 106, its upper end being adapted to contact with a bearing plate 107 on the forward end of the feed slide 60. The lower end of this feed lever 105 is in contact with the periphery of a special form of rotatable cam 108. As shown more clearly in Fig. 12, this cam 108 is generally of spiral form, the periphery, however, between the portions indicated at *a* are concentric, the other portions gradually decreasing in radius around the periphery. This form of cam 108 by being slowly and uniformly rotated gradually oscillates the pivoted lever 105 during the major portion of its rotation after which the movement of the lever 105 is maintained stationary and therefore no further rearward movement of the slide 60 takes place. As soon as the rotation of the cam has been completed, the lower end of the lever 105 is oscillated rearwardly by means of the spring 67 acting upon the slide 60 so that its lower end is again in contact with the cam at a point of minimum radius, and the slide is returned to its initial position with the blank out of contact with the wheels.

The purpose of this form of cam surface is to permit a gradual feeding movement of the blank A in the manner described above, this movement taking place uniformly and while the work blank A is being constantly rotated and being moved about in its orbital path. The cylindrical or concentric portion of the cam 108 in connection with its spiral portion permits the gear blank A to be advanced relative to the wheels 30 to a predetermined position after which it is permitted to rotate and move about its orbital path without further advancing or feeding movement. This permits continued action of the abrasive wheels 30 upon the flanks of the teeth, this dwell eliminating all tendency for ununiform work being formed due to the strains of the parts during feeding.

Preferably, the rotative movement of the feed cam 108 is obtained directly from the main driving shaft 88 which is coupled through the gearing shown in Fig. 3 to the cam shaft 109. It will be noted that a speed reduction is accomplished between the main driving shaft 88 and the cam shaft 109.

Referring to Figs. 3, 7 and 9 of the drawings, the driving means for the cam shaft 108 will be seen. The shaft 90 forming a part of the driving connection between the main driving shaft 88 and the shaft 94 for rotating the spindle 20 has mounted thereon a pinion 110. This pinion 110 is in mesh with a gear 111 on shaft 112. A pinion 113 on shaft 112 is in mesh with a gear 114 on shaft 115. Shaft 115 is carried by a swinging frame 116 which in one position causes a worm 117 on shaft 115 to mesh with a worm wheel 118. In the opposite position of the swinging frame 116, the worm is disengaged from the worm wheel 118. To move the frame 116 to engage and disengage the worm 117, the frame is provided with gear teeth 119; these are adapted to mesh with rack teeth on a rod 120. Movement of rod 120 axially will therefore oscillate the frame 116. To move this rod 120, an oscillating hand lever 121 is provided having its lower end formed with gear teeth in mesh with a pinion 122 on a short shaft 123. On shaft 123 is another pinion 124 in mesh with rack teeth on the rod 120. It will therefore be seen that oscillation of the hand lever 121 will start and stop rotation of the worm wheel 118.

Worm wheel 118 is mounted on an inclined shaft 125 on which is a helical gear 126 in mesh with a corresponding gear 127 on the cam shaft 109.

In order that the operator may at all times know exactly how much feeding movement has taken place, the shaft 125 forming a part of the driving means for the cam shaft 109 is extended as shown in Fig. 7 to a point in front of the forward vertical surface of the base 10. The upper end of this shaft is mounted in a bracket 128 fastened to this part of the base. This shaft 125 carries a hand wheel 129 by means of which the feed cam 108 may be manually rotated in either direction while the driving mechanism therefor is out of engagement. A pinion 130 on this shaft 125 is in mesh with a gear 131, the ratio between this pinion and gear being the same as the driving means between the shaft 125 and the cam 108. It will therefore be seen that with indicia applied to this gear 131, rotation thereof will at all times serve to indicate the exact position of the feed cam 108 and thus of the feed slide 60. For convenience a zero line is provided on a suitable extension 132 mounted on the bracket 128.

In order to discontinue further operation of the machine when the cycle of operation has been completed, we provide an automatic stopping means so that the machine may be brought to rest as soon as the feed cam 108 completes one complete revolution. At this time the work A and the spindle 20 upon which it is mounted have been brought to their final position. For this purpose, we mount a slide member having a pin 136 thereon, as shown in Fig. 9. This may preferably surround the cam shaft 109 and is forced forwardly by a small coiled spring 137 so that its reduced forward end may engage a transverse slot in a vertical plunger 138. This vertical plunger 138 is slidably mounted in bearings on the front vertical surface of the machine and is resiliently retained in its uppermost position by a compressible coiled spring 139. Mounted on the gear 53 fast to the forward end of the main switch operating shaft 47 is an eccentric pin 140. This lies adjacent a cut-away portion of the vertical plunger 138. Oscillation of the main control lever 50 through oscillation of the segment 52 as shown in Fig. 10 oscillates the gear 53 on the switch shaft 47 to open and close the main switch, not shown. It is by these means that the main operating motor 45 is started and stopped. Oscillation of the main control lever in a direction to start rotation of the motor 45 oscillates the pin 140 and forces the vertical plunger 138 downward so that the forward end of the detent on slide 135 is engaged within the notch of the plunger 138.

As soon as operation has been completed and the feed cam 108 has been rotated through a complete revolution and is again in its initial position, a cam 142 on the shaft 109 thereon shown in Fig. 9 is in position to engage the pin 136 outstanding from the slide 135 carrying the detent member so that the detent is retracted and the vertical plunger 138 released. By reason of the coiled spring 139 which forces the plunger 138 upward and the pin 140 on the gear 53, vertical movement of this plunger 138 oscillates the switch rod 47 to open the main control switch or other device thus stopping operation of the machine.

When it is again desired to start operation of the machine, it is only necessary to again oscillate the main control lever 50 in a clockwise direction which again closes the main motor switch by rotation of the gear 53 on the forward end of its operating shaft 47. This movement of the lever 50 will also move the vertical plunger 138 downward to again permit engagement of the detent on slide 135 with the recess in plunger 138 to retain it in its lowermost position.

The recess provided in the forward surface of the vertical plunger 138 is preferably elongated as shown so that after the plunger 138 has been retained in its lowermost position, the control lever 50 may be used to start and stop operation of the machine without repeated movement of the automatic stopping means. Also the stopping mechanism after once being set is always in position to stop further operation of the machine as soon as it has completed its cycle and the cams 109 and 142 have rotated a complete revolution.

Preferably to facilitate manipulation of the machine, we provide a drum 140* on the main driving shaft 88. A lever 141 pivoted at 142* is provided at its lower end with a brake shoe 143. This shoe 143 contacts with the surface of the drum 140* upon oscillation of the lever 141 so that the operation of the machine may promptly be stopped at any predetermined point in its cycle.

Coming now to a brief description of the operation of the machine, it will be understood that the parts 76 and 77 forming the serrated opening 79 as shown in Fig. 5 and also the plate 80 provided with the opening 82 as shown in Fig. 6 will be chosen relatively to the particular gear which is to be ground and properly located in predetermined positions within the recesses in the member 75. With these members locked securely in their positions on the feed slide 60 and with the wheel heads 25 and their slides adjusted correctly, operation of the machine may be started. This serves to rotate the work spindle 20 and also to move it about an orbital path so that the gear blank A in effect will be rolled upon its particular pitch cylinder which in the present instance corresponds exactly to the pitch cylinder of the master gear 85. In so rotating and bodily moving the gear blank A, the flanks of the teeth thereon are rolled past the work engaging surface of each of the wheels 30. During operation one of the wheels 30 operates upon similar sides of each of the teeth and the other wheel operates upon the opposite sides of each of the teeth.

As soon as this movement of the work spindle 20 has been started, the feed movement of the slide 60 also is begun which, by rotation of the feed cam 108 and oscillation of the feed lever 105, moves the feed slide 60 with its attached parts a very slight distance rearwardly. This movement of the feed slide 60 affects the path of movement of the work spindle 20 and blank A in such a way that it advances the blank or feeds the blank A directly toward the work engaging sides of the wheels 30. As soon as this feeding movement is accomplished, which occurs at the end of the rotation of the feed cam 108, the feed lever 105 is permitted to oscillate back again and the feed slide 60 is moved a slight distance forwardly, thus disengaging the work A from the wheels 30. At this point, the automatic stopping mechanism is actuated and the control shaft 47 is oscillated to open the main switch or other means to stop further rotation of the motor 45.

The continued rotation of the work spindle 20 and its movement about its orbital path as above described accomplishes the automatic indexing of the blank without special mechanism being provided for that purpose. The number of teeth in the periphery of the opening 79 is selected which is incommensurate with the number of teeth in the master gear 85 and the blank A. Each complete movement therefore of the spindle 20 about its orbit will cause the blank to be rotated a fraction of a revolution. Each successive orbital movement of the spindle 20 will present different teeth on the gear blank to the wheels 30. This movement also will be progressive and therefore after the spindle 20 has made a plurality of movements about its orbit each of the tooth curves will have been brought into contact with the abrasive wheels. Continued operation therefore will finally grind the tooth curves to their proper involute forms.

What we claim is:—

1. A machine for generating the tooth curves of gears comprising in combination, a base, a cutting wheel rotatably mounted thereon and engaging the work upon a radial face, a work spindle supported on said base so that it may move in any direction while its axis is maintained in parallel positions, a transversely movable slide on said base, means carried by said slide for limiting the bodily movements of said work spindle, means to move said slide to effect feeding movements of a gear blank thereon relative to said cutting wheel, and means to rotate the work spindle.

2. A machine for generating tooth curves of gears comprising in combination, a base, a cutting wheel rotatably mounted thereon, freely swinging arms supported on said base, a work spindle supported on the free ends of said arms whereby it may move in any direction while its axis is maintained in parallel positions, a transversely movable slide on said base, means carried by said slide for limiting the bodily movements of said work spindle, means to move said slide to effect feeding movements of a gear blank thereon relative to the cutting wheel, and means to rotate the work spindle.

3. A machine for generating tooth curves of gears comprising in combination, a base, a cutting wheel rotatably mounted thereon and engaging the work upon a radial face, a work spindle supported on said base so that it may move in any direction while its axis is maintained in parallel positions, a transversely movable slide on said base, means carried by said slide for limiting the bodily movements of said work spindle, cam means to move said slide to effect feeding movements of a gear blank thereon relative to said cutting wheel, and means to rotate the work spindle.

4. A machine for generating tooth curves of gears comprising in combination, a base, a cutting wheel rotatably mounted thereon, a work spindle supported on said base so that it may move in any direction while its axis is maintained in parallel positions, a transversely movable slide on said base, means carried by said slide for limiting the bodily movements of said work spindle, means to resiliently hold said work in contact with said wheel, means to relatively move said work and slide to effect feeding, and means to rotate the spindle.

5. A machine for generating tooth curves of gears comprising in combination, a base, a cutting wheel rotatably mounted thereon, a work spindle supported on said base so that it may move in any direction while its axis is maintained in parallel positions, a transversely movable slide on said base, means carried by said slide for limiting the bodily movements of said work spindle, an arm pivotally attached to said slide and having an opening adapted to engage said work spindle to resiliently hold said work in contact with said wheel, means to relatively move said work and slide to effect feeding, and means to rotate the spindle.

6. A machine for generating tooth curves of gears comprising in combination, a base, a cutting wheel rotatably mounted thereon, a work spindle supported on said base so that it may move in any direction while its axis is maintained in parallel positions, a transversely movable slide on said base, means carried by said slide for limiting the bodily movements of said work spindle, an arm pivotally attached to said slide and having an elongated opening adapted to engage said work spindle, a detent adjacent the free end of said arm to hold said arm toward each of its extreme lateral positions, means to move said slide to effect feeding movements of a gear blank thereon relative to said cutting wheel, and means to rotate said spindle.

7. A machine for generating tooth curves of gears comprising in combination, a base, a cutting wheel rotatably mounted thereon, a work spindle supported on said base so that it may move in any direction while its axis is maintained parallel to a plane, a transversely movable slide on said base, means carried by said slide for limiting the bodily movements of said work spindle, means to move said slide to effect feeding movements of a gear blank thereon relative to said cutting wheel, means to discontinue said feeding movement and return said slide to its initial position, and means to rotate the work spindle.

8. A machine for generating tooth curves of gears comprising in combination, a base, a cutting wheel rotatably mounted thereon, a work spindle supported on said base so that it may move in any direction while its axis is maintained in parallel positions, a transversely movable slide on said base, means carried by said slide for limiting the bodily movement of said work spindle, means to move said slide to effect feeding movements of a gear blank thereon relative to said cutting wheel, means to rotate said work spindle while it is being bodily moved, means to return the slide to its initial position after a predetermined feeding movement and stop further operation of the machine.

9. A machine for generating tooth curves of gears comprising in combination, a base, a cutting wheel rotatably mounted thereon, a work spindle supported on said base so that it may move in any direction while its axis is maintained parallel to a plane, a transversely movable slide on said base, means carried by said slide for limiting the bodily movements of said work spindle, cam means to move said slide to effect feeding movements of a gear blank thereon relative to said cutting wheel, means to discontinue said feeding movement when the cam has made a complete revolution and returned said slide to its initial position, and means to rotate the work spindle.

10. A machine for generating tooth curves of gears comprising in combination, a base, a cutting wheel rotatably mounted thereon, a work spindle supported on said base so that it may move in any direction while its axis is maintained in parallel positions, a transversely movable slide on said base, serrated means carried by said slide for limiting the bodily movements of said work spindle, means to effect relative feeding movements between said wheel and work, and means to rotate said work spindle while it is constrained to move in an orbital path.

11. A machine for generating tooth curves of gears comprising in combination, a base, a cutting wheel rotatably mounted thereon, a work spindle supported on said base so that it may move in any direction while its axis is maintained in parallel positions, a transversely movable slide on said base, means carried by said slide for limiting the bodily movements of said work spindle, means to effect feeding movements of the work relative to the wheel, a lever contacting with said slide, cam means to oscillate the lever to advance the slide, and means to rotate the work spindle while it is constrained to move in an orbital path.

In testimony whereof, we hereto affix our signatures.

HUBERT D. TANNER.
CARROLL KNOWLES.